United States Patent
Singh et al.

(10) Patent No.: US 8,838,154 B1
(45) Date of Patent: Sep. 16, 2014

(54) METHOD AND SYSTEM OF PAGING AN ACCESS TERMINAL

(75) Inventors: Jasinder P. Singh, Olathe, KS (US); Sachin R. Vargantwar, Overland Park, KS (US); Manoj Shetty, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 933 days.

(21) Appl. No.: 12/905,868

(22) Filed: Oct. 15, 2010

(51) Int. Cl.
*H04W 68/00* (2009.01)
*H04W 4/00* (2009.01)
*H04B 7/00* (2006.01)

(52) U.S. Cl.
USPC .......................... 455/458; 455/422.1; 455/515

(58) Field of Classification Search
USPC ....................... 455/422.1, 458, 515
See application file for complete search history.

(56) References Cited

U.S. PATENT DOCUMENTS

| | | | |
|---|---|---|---|
| 6,628,942 B1* | 9/2003 | Beming et al. | 455/432.1 |
| 2002/0147023 A1* | 10/2002 | Sawada et al. | 455/456 |
| 2006/0099972 A1* | 5/2006 | Nair et al. | 455/458 |
| 2010/0124223 A1* | 5/2010 | Gibbs et al. | 370/389 |
| 2012/0329442 A1* | 12/2012 | Luft et al. | 455/418 |

* cited by examiner

*Primary Examiner* — Yuwen Pan
*Assistant Examiner* — Ayodeji Ayotunde

(57) ABSTRACT

An access network may receive an incoming communication for an idle access terminal having a last-known location in a first service area of the access network. In response to receiving the incoming communication, the access network may determine whether the last-known location is proximate to a border between the first service area and a second service area of the access network. If so, the access network may define a border paging area encompassing one or more coverage areas within the second service area that are proximate to the last-known location. In turn, the access network may determine a representative paging-channel occupancy of the border paging area. Based on the representative paging-channel occupancy, the access network may then select a time at which to initiate a border page of the access terminal in the border paging area and then perhaps initiate the border page at the selected time.

17 Claims, 3 Drawing Sheets

METHOD AND SYSTEM OF PAGING AN ACCESS TERMINAL

BACKGROUND

To provide cellular wireless communication service, a wireless service provider typically employs an access network that provides wireless service to one or more access terminals (e.g., cell phones, PDAs, laptops, netbooks, tablets, and/or other wirelessly equipped devices) in respective service areas. Each such service area may be divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which the access terminal may communicate with access terminals. In turn, the access network may provide connectivity with the one or more transport networks, such as the public switched telephone network (PSTN) and/or the Internet.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward link channels, such as forward traffic channels, for carrying communications from the access network to the access terminals. As another example, each wireless link may include a plurality of reverse link channels, such as reverse traffic channels, for carrying communications from the access terminals to the access network. Typically, the number of channels on a given wireless link, and thus the number of simultaneous communications the given wireless link can carry, is limited by hardware and/or protocol constraints. As such, an access network may try to conserve its limited supply of wireless link channels.

One common way an access network conserves channels is by employing a paging process to locate idle access terminals before assigning traffic channels to those access terminals. In particular, when an access network receives an incoming communication for an idle access terminal, the access network may initiate a sequence of pages of the access terminal in the service area that encompasses the access terminal's last-known location (i.e. the last-known service area). For instance, the access network may initiate a first one of a sequence of pages of the access terminal in a first paging area, which may encompass one or more coverage areas within the last-known service area. If the access terminal is located in the first paging area and responds to the first one of a sequence of pages, the access network may then assign a traffic channel to the idle access terminal in the coverage area of the first paging area from which the access terminal responded. Alternatively, if the access terminal is not located in the first paging area and/or does not respond to the first page message, the access network may initiate a second one of a sequence of pages of the access terminal in a second paging area, which may encompass the first paging area and/or one or more other coverage areas within the last-known service area. The access network may continue this process until it locates the access terminal, pages the access terminal in all coverage areas within the last-known service area, and/or reaches a time or attempt limit. This paging process may thus enable the access network to locate the access terminal before assigning it a traffic channel.

OVERVIEW

In addition to paging an access terminal in its last-known service area as described above, an access network may also be configured to page the access terminal in a service area that is adjacent to the last-known service area (i.e., an adjacent service area). In particular, when the access network receives an incoming communication for an idle access terminal, the access network may determine whether the access terminal's last-known location is proximate to a border between the last-known service area and an adjacent service area (e.g., in a coverage area of the last-known service area that borders the adjacent service area and/or within a predefined distance from a location on the border between the last-known service area and the adjacent service area). If so, the access network may initiate a "border page" of the access network in a "border paging area" encompassing one or more coverage areas within the adjacent service area that are proximate to the access terminal's last-known location. According to a current paging process, the access network may initiate this border page of the access terminal at one predefined time during the sequence of pages of the access terminal within the last-known service area (e.g., contemporaneously with initiation of the first one of the sequence of pages). If the access terminal is located in the border paging area and responds to the border page, the access network may then assign a traffic channel to the access terminal in the coverage area of the border paging area from which the access terminal responded.

By additionally paging the access terminal in the adjacent service area, access network may improve its likelihood of locating of locating the access terminal during the paging process. In doing so, however, the access network may also increase the paging-channel occupancy of coverage areas at the border of its service areas, especially if the access network is configured to initiate a border page of an access terminal within an adjacent service area at the same time that it initiates the first one of the sequence of pages of the access terminal within the last-known service area. In some cases, this increased paging-channel occupancy of the border coverage areas may cause an overload on paging channels in those coverage areas and thereby degrade network performance. Accordingly, a paging process that enables the access network to account for the paging-channel occupancy of border coverage areas when initiating a border page is desirable.

Disclosed herein is such a paging process. According to the disclosed paging process, when an access network receives an incoming communication for an idle access terminal having a last-known location in a first service area, the access network may determine whether the access terminal's last-known location is proximate to a border between the first service area and a second service area. If so, the access network may define a border paging area encompassing one or more coverage areas within the second service area that are proximate to the access terminal's last-known location. In turn, the access network may determine a representative paging-channel occupancy of the border paging area. Based on this representative paging-channel occupancy, the access network may then select a time at which to initiate a border page of the access terminal in the border paging area. For instance, if the access network determines a lower representative paging-channel occupancy of the border paging area, the access network may select an earlier time at which to initiate the border page (e.g., contemporaneously with a first one of a sequence of pages of the access terminal within the first service area). Alternatively, if the access network determines a higher representative paging-channel occupancy of the border paging area, the access network may select a later time at which to initiate the border page (e.g., contemporaneously with a second or third one of a sequence of pages of the access terminal within the first service area). Thereafter, the access network may initiate the border page of the access terminal in the border paging area at the selected time.

Advantageously, the disclosed paging process enables the access network to adjust the timing of a border page based on the paging-channel occupancy of a border paging area. According to the disclosed paging process, when the access network determines a lower paging-channel occupancy of the border paging area, the access network may initiate the border page earlier in the paging process, which may in turn improve the likelihood of locating the access terminal earlier in the paging process and reduce call-setup time. On the other hand, when the access network determines a higher paging-channel occupancy of the border paging area, the access network may initiate the border page later in the paging process, which may in turn reduce the high paging-channel occupancy of the border paging area.

A first embodiment of the disclosed paging process may take the form of an exemplary method that includes (a) receiving an incoming communication for an idle access terminal having a last-known location in a first service area of an access network, (b) in response to receiving the incoming communication, determining that the last-known location is proximate to a border between the first service area and a second service area of the access network and then defining a border paging area encompassing one or more coverage areas within the second service area that are proximate to the last-known location, (c) determining a representative paging-channel occupancy of the border paging area, and (d) based on the representative paging-channel occupancy, selecting a time at which to initiate a border page of the access terminal in the border paging area. Further, the exemplary method may additionally include initiating the border page of the access terminal in the border paging area at the selected time.

The determined representative paging-channel occupancy of the border paging area may also take various forms. In one example, the representative paging-channel occupancy of the border paging area may be an average of paging-channel occupancies of the one or more coverage areas encompassed by the border paging area. In another example, the representative paging-channel occupancy of the border paging area may be a maximum of paging-channel occupancies of the one or more coverage areas encompassed by the border paging area. In yet another example, the representative paging-channel occupancy of the border paging area may be a ratio between a first summation of a current amount of paging-channel data in the one or more coverage areas encompassed by the border paging area and a second summation of a total capacity of paging-channels in the one or more coverage areas encompassed by the border paging area. Other examples are possible as well.

The time at which to initiate a border page of the access terminal in the border paging area may also take various forms. In one example, the time may be contemporaneous with a time at which to initiate a given one of a sequence of pages of the access terminal in the first service area. For instance, the time may be contemporaneous with a time at which to initiate a first one of a sequence of pages of the access terminal in the first service area (e.g., if the representative paging-channel occupancy is higher than a threshold paging-channel occupancy). Alternatively, the time may be contemporaneous with a time at which to initiate a second one of a sequence of pages of the access terminal in the first service area (e.g., if the representative paging-channel occupancy is lower than a threshold paging-channel occupancy). Other examples are possible as well.

A second embodiment of the disclosed paging process may take the form of an exemplary method that includes (a) receiving, at a first sub-network that serves a first service area of an access network, a notification of an incoming communication for an idle access terminal having a last-known location in the first service area, (b) in response to receiving the notification of the incoming communication, the first sub-network determining that the last-known location is proximate to a border between the first service area and a second service area of the access network and then defining a border paging area encompassing one or more coverage areas within the second service area that are proximate to the last-known location, (c) the first sub-network determining a representative paging-channel occupancy of the border paging area (e.g., one or more of the representative paging-channel occupancies described above), and (d) based on the representative paging-channel occupancy, the first sub-network selecting a time at which to request that a second sub-network serving the second service area initiate a border page of the access terminal in the border paging area. Further, the exemplary method may additionally include obtaining an indicator of the last-known location in response to receiving the notification of the incoming communication before determining that the last-known location is proximate to the border. Further yet, the exemplary method may additionally include the first sub-network requesting that the second sub-network initiate the border page of the access terminal in the border paging area at the selected time.

The feature of determining the representative paging-channel occupancy of the border paging area may take various forms. In one example, this feature may include (1) the first sub-network sending the second sub-network a request for data indicating the respective paging-channel occupancy of each of the one or more coverage areas encompassed by the border paging area, (2) as a result of the request, the first sub-network receiving from the second sub-network data indicating the respective paging-channel occupancy of each of the one or more coverage areas encompassed by the border paging area, and (3) the first sub-network determining the representative paging-channel occupancy of the border paging area based on the received data indicating the respective paging-channel occupancy of each of the one or more coverage areas encompassed by the border paging area. Other examples are possible as well.

A third embodiment of the disclosed paging process may take the form of an exemplary access network entity (e.g., a base station controller and/or a mobile switching center) that includes (a) a communication interface configured to facilitate communication with an access terminal located in a service area of an access network, (b) a processor, (c) data storage, and (d) program instructions stored in data storage and executable by the processor to carry out the features described herein.

These as well as other aspects and advantages will become apparent to those of ordinary skill in the art by reading the following detailed description, with reference where appropriate to the accompanying drawings.

DETAILED DESCRIPTION

I. Communication System

Figure 1:
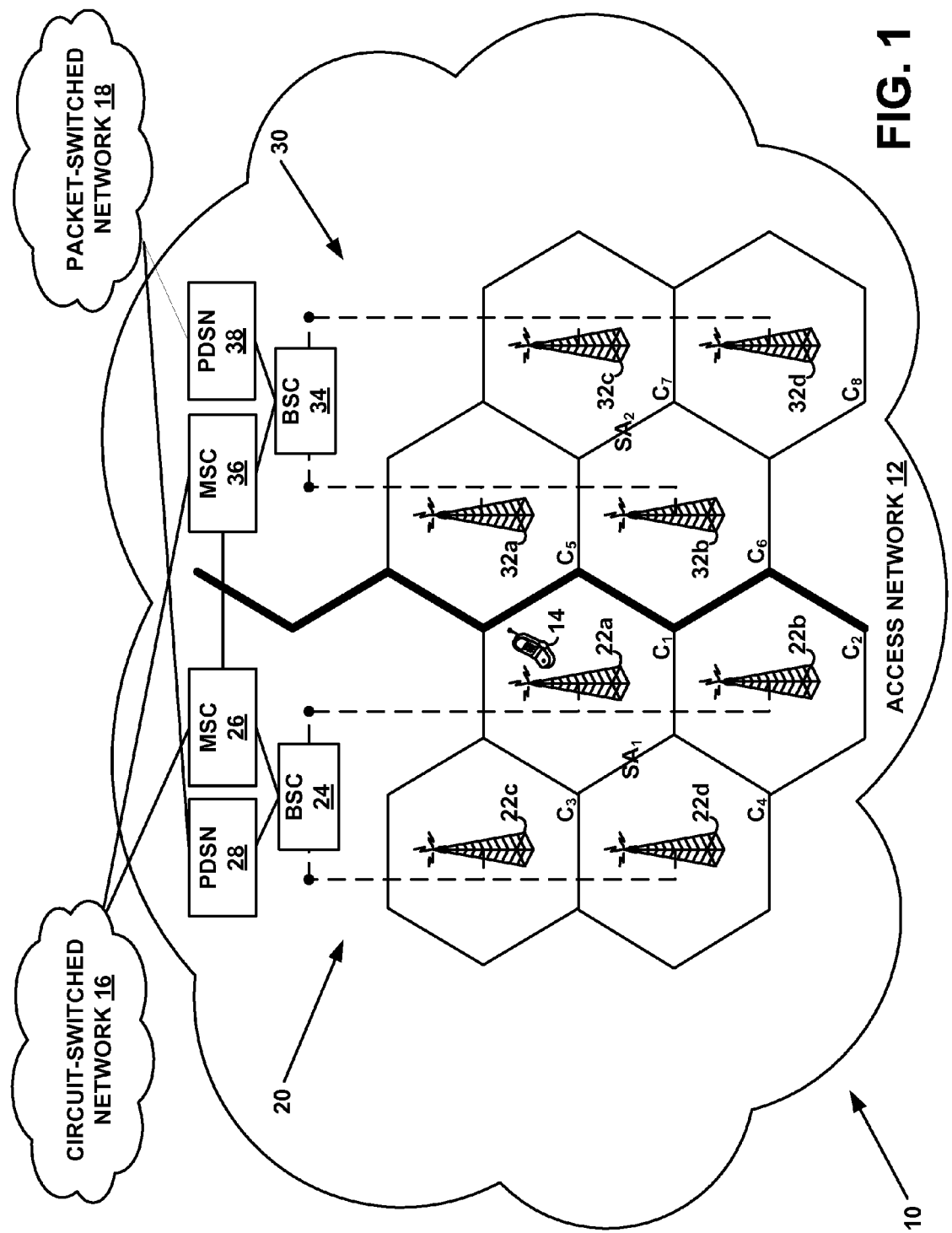
FIG. 1 is a simplified block diagram of a communication system in which a paging process can be implemented.

Referring to the drawings, FIG. 1 is a simplified block diagram of a communication system 10 in which an exemplary method can be implemented. It should be understood, however, that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, system 10 may include an access network 12 that includes a plurality of sub-networks, such as a first sub-network 20 and a second sub-network 30. (Although FIG. 1 depicts access network 12 as including two sub-networks, it should be understood that access network 12 may include more than two sub-networks.) Each sub-network of access network 12 may be configured to provide wireless service to one more access terminals, such as access terminal 14, in a respective service area.

Each sub-network of access network 12 may include one or more base transceiver stations (BTSs), such as BTSs 22a-d in sub-network 20 and BTSs 32a-d in sub-network 30. (Although FIG. 1 depicts each sub-network as including two BTSs, it should be understood that each sub-network may include more than two BTSs.) Each BTS may be any entity that facilitates wireless communication between an access network and one or more access terminals, such as access terminal 14. In particular, each BTS may radiate to define one or more wireless coverage areas. For instance, as shown, BTSs 22a-d in sub-network 20 may radiate to define a respective cells $C_1$-$C_4$, which may collectively define a service area $SA_1$ of sub-network 20. Further, as shown, BTSs 32a-d in sub-network 30 may radiate to define respective cells $C_5$-$C_8$, which may collectively define a service area $SA_2$ of sub-network 21. Within each of its coverage areas, each BTS may provide at least one wireless link (not shown) on a respective carrier frequency over which the BTS may communicate with access terminal 14. (As used herein, the term "carrier frequency" may include a single carrier frequency or a set of carrier frequencies). Each BTS may also function to control aspects of wireless communication with access terminal 14, such as aspects of paging, connection establishment, handoff, and/or power control for instance. Each BTS may perform other functions as well.

Each wireless link provided by access network 12 may carry communications between the sub-network and access terminal 14 according to any of a variety of protocols, including EIA/TIA/IS-2000 Rel. 0, Rel. A, or other versions thereof ("IS-2000"), EIA/TIA/IS-856 Rel. 0, Rev. A, or other versions thereof ("IS-856"), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, each wireless link may be divided into a forward link for carrying communications from access network 12 to one or more access terminals and a reverse link for carrying communications from one or more access terminals to access network 12. Further yet, each forward and reverse link may be divided into a plurality of channels using any mechanism now known or later developed, including code division multiplexing, time division multiplexing, and/or frequency division multiplexing for instance. At least one such forward channel may then be configured to carry page messages, such as an IS-2000 forward paging channel and an IS-856 forward control channel. (This type of forward channel may be generally referred to herein as "a paging channel," but it should be understood that this type of channel may be configured to carry other control messages as well.)

As shown in FIG. 1, each sub-network may also include at least one base station controller (BSC) (also know as a radio network controller), such as BSC 24 in sub-network 20 and BSC 34 in sub-network 30, to which BTSs couple. (Although FIG. 1 depicts each sub-network as including one BSC that couples to all BTSs, it should be understood that a sub-network may include more than one BSC, in which case each BSC may couple to a subset of the BTSs in each sub-network. Further, although each BSC is depicted as a separate entity from its coupled BTSs, it should be understood that each BSC may be integrated together in whole or in part with one or more BTS.) Each BSC may control aspects of its coupled BTSs as well as aspects of wireless communication with access terminal 14, such as aspects of paging, connection establishment, handoff, and/or power control for instance. Each BSC may perform other functions as well.

Further, each sub-network may include one mobile switching center (MSC), such as MSC 26 in sub-network 20 and MSC 36 in sub-network 30, to which each BSC couples. As shown, each MSC may provide connectivity with a circuit-switched network 16 (e.g., the public switched telephone network (PSTN). Further, as shown, each MSC may provide connectivity with other MSCs in access network 12 (e.g., via a signaling link or network), thereby facilitating communication between the sub-networks of access network 12. Further yet, each MSC may control aspects of its coupled BTS(s) and/or BSC(s) as well as aspects of wireless communication with access terminal 14, such as aspects of paging, connection establishment, handoff, and/or power control for instance.

Moreover, each sub-network may include a packet data serving node (PDSN), such as PDSN 28 in sub-network 20 and PDSN 38 in sub-network 30, to which each BSC couples. As shown, each PDSN may provide connectivity with a packet-switched network 16 (e.g., the Internet). Each PDSN may perform other functions as well.

Although not shown, the sub-networks of access network 12 may include and/or have access to various other entities as well. For example, each sub-network may include or have access to a home location register (HLR) and/or a visitor location register (VLR) that maintains information about subscribers and/or access terminals in access network 12, such as account information, preferences, and/or a last-known location for instance. Other examples are possible as well.

Access terminal 14 may be any device capable of receiving wireless service from access network 12. By way of example only, access terminal 14 may take the form of a cellular telephone, a computer (e.g., a desktop, laptop, tablet, netbook, etc.), a personal digital assistant (PDA), or a personal navigation device (PND). Other examples are possible as well. For purposes of illustration only, the following description will assume that access terminal 14 is in an idle state (i.e., is not engaging in an active communication session with access network 12) and has a last-known location somewhere in service area $SA_1$.

II. Current Paging Process

In the example communication system 10 of FIG. 1, access network 12 may employ a paging process to locate access terminal 14 before assigning it a forward traffic channel. This paging process may take various forms.

a. Local Paging

In normal operation, access network 12 may employ a "local paging" mechanism in which it pages access terminal 14 in a service area encompassing the last-known location of access terminal 14 (i.e., a last-known service area). In particular, in response to receiving an incoming communication for access terminal 14, access network 12 may route the request to the sub-network that serves the access terminal's last-known service area, such as sub-network 20 in FIG. 1. In turn, sub-network 20 may initiate a sequence of "local pages" of access terminal 14 in service area $SA_1$. For instance, sub-network 20 may initiate a first one of the sequence of local pages of access terminal 14 in a first local paging area encompassing one or more coverage areas within service area $SA_1$. (As used herein, the terms "first," "second," and "third" may indicate temporal ordering only when referring to a sequence of pages). If access terminal 14 is located in the first paging area and responds to the first local page on a given wireless link, sub-network 20 may then assign a traffic channel to access terminal 14 on the given wireless link. Alternatively, if access terminal 14 is not located in the first paging area and/or does not respond to the first local page, sub-network 20 may initiate a second one of the sequence of local pages of access terminal 14 in a second local paging area encompassing the first paging area and/or one or more other coverage areas within service area $SA_1$. Sub-network 20 may continue this process until it locates access terminal 14, pages access terminal 14 in all coverage areas of service area $SA_1$, and/or reaches a time or attempt limit.

Sub-network 20 may initiate each local page of access terminal 14 within service area $SA_1$ in various manners. In one example, BSC 24 and/or MSC 26 may first define the local paging area in which to page access terminal 14 within service area $SA_1$ using any technique now known or later developed. For instance, BSC 24 and/or MSC 26 may define the local paging area using zone-based paging techniques, in which case the defined local paging area may include one or more predefined "zones" of coverage areas in service area $SA_1$. Alternatively, BSC 24 and/or MSC 26 may define the local paging area using distance-based paging techniques, in which case the defined local paging area may include coverage areas in service area $SA_1$ that are at least partially within a predefined distance from the last-known location of access terminal 14. Other examples are possible as well. After defining the local paging area, BSC 24 and/or 26 may then direct each BTS serving the defined local paging area to send a page message for receipt by access terminal 14. In turn, each such BTS may send a page message addressed to access terminal 14 on a paging channel in the defined local paging area. Sub-network 20 may initiate each local page of access terminal 14 in other manners as well.

b. Border Paging

In addition to employing the local paging mechanism to page access terminal 14 in its last-known service area, access network 12 may also employ a "border paging" mechanism in which it pages access terminal 14 in a service area that is adjacent to the last-known service area (i.e., an adjacent service area). In particular, as described above, access network 12 may route the request to set up a communication with access terminal 14 to the sub-network that serves the access terminal's last-known service area, such as sub-network 20 in FIG. 1. In turn, sub-network 20 may determine whether the last-known location of access terminal 14 is proximate to a border between service area $SA_1$ and an adjacent service area, such as service area $SA_2$. If so, in this example, sub-network 20 may request that sub-network 30 initiate a "border page" of access terminal 14 in a "border paging area" encompassing one or more coverage areas within service area $SA_2$ that are proximate to the access terminal's last-known location within service area $SA_1$, such as cells $C_5$ and $C_6$. In response to the border page request, sub-network 30 may initiate a single border page of access terminal 14 in the border paging area within service area $SA_2$. If access terminal 14 is located in the border paging area and responds to the border page on a given wireless link, sub-network 30 may then assign a traffic channel to access terminal 14 on the given wireless link. Alternatively, if access terminal 14 is not located in the border paging area and/or does not respond to the border page, sub-network 30 may have no further involvement in the paging process.

Sub-network 20 may request the border page by sub-network 30 in various manners. In one example, MSC 26 of sub-network 20 may send to MSC 36 of sub-network 30 an "intersystem page" message that requests a page of access terminal 14 in the border paging area within service area $SA_2$ (e.g., an ANSI-41 ISPAGE2 message). Sub-network 20 may request the border page by sub-network 30 in other manners as well.

Sub-network 30 may initiate the border page of access terminal 14 within service area $SA_2$ in various manners. In one example, BSC 34 and/or MSC 36 may first identify the border paging area in which to page access terminal 14 within service area $SA_2$, preferably based on an intersystem page message received from MSC 26. After identifying the border paging area, BSC 34 and/or 36 may then direct each BTS serving the border paging area to send a page message for receipt by access terminal 14. In turn, each such BTS may send a page message addressed to access terminal 14 on a paging channel of border paging area. Sub-network 30 may initiate each page of access terminal 14 in other manners as well.

According to a current border paging mechanism, sub-network 20 may be configured to request a border page of access terminal 14 at one predefined time during the sequence of local pages of access terminal 14 within service area $SA_1$. In particular, according to a current border paging mechanism, sub-network 20 may be configured to request a border page of access terminal 14 at the same time that it initiates a given one of the local pages of access terminal 14 within service area $SA_1$. For instance, sub-network 20 may be configured to request a border page of access terminal 14 at the same time that it initiates a first local page of access terminal 14 within service area $SA_1$. Alternatively, sub-network 20 may be configured to request a border page of access terminal 14 at the same time that it initiates a subsequent (e.g., second) local page of access terminal 14 within service area $SA_1$, which may occur only if sub-network 20 does not locate access terminal 14 with any previous local page.

By employing the above-described border paging mechanism, access network 12 may improve its likelihood of locating access terminal 14 during the paging process. In doing so, however, access network 12 may also increase the paging-channel occupancy of coverage areas at the border of its service areas (e.g., cells $C_1$-$C_2$ in service area $SA_1$ and cells $C_5$-$C_8$ in service area $SA_2$). This is especially the case if the sub-networks of access network 12 are configured to request a border page at the same time that they initiate a first one of the sequence of local pages, as such a configuration requires the sub-networks to request a border page every time they initiate a local page of an access terminal located near a border. In some cases, this increased paging-channel occupancy of the border coverage areas may cause an overload on paging channels in those coverage areas and thereby degrade network performance. Accordingly, a paging process that enables access network 12 to account for the paging-channel occupancy of border coverage areas when employing a border paging mechanism is desirable.

III. Exemplary Paging Process

As noted above, disclosed herein is such a paging process. According to the disclosed paging process, when an access network receives an incoming communication for an idle access terminal having a last-known location in a first service area, the access terminal may determine whether the access network's last-known location is proximate to a border between the first service area and a second service area. If so, the access network may define a border paging area encompassing one or more coverage areas within the second service area that are proximate to the access terminal's last-known location. In turn, the access network may determine a representative paging-channel occupancy of the border paging area. Based on this representative paging-channel occupancy, the access network may then select a time at which to initiate a border page of the access terminal in the border paging area. For instance, if the access network determines a lower representative paging-channel occupancy of the border paging area, the access network may select an earlier time at which to initiate the border page (e.g., contemporaneously with a first one of the sequence of pages of the access terminal within the first service area). Alternatively, if the access network determines a higher representative paging-channel occupancy of the border paging area, the access network may select a later time at which to initiate the border page (e.g., contemporaneously with a second or third one of a sequence of pages of the access terminal within the first service area). Thereafter, the access network may initiate the border page of the access terminal in the border paging area at the selected time.

Advantageously, the disclosed paging process enables the access network to adjust the timing of a border page based on the paging-channel occupancy of a border paging area. According to the disclosed paging process, when the access network determines a lower paging-channel occupancy of the border paging area, the access network may initiate the border page earlier in the paging process, which may in turn improve the likelihood of locating the access terminal earlier in the paging process and reduce call-setup time. On the other hand, when the access network determines a higher paging-channel occupancy of the border paging area, the access network may initiate the border page later in the paging process, which may in turn reduce (or at least avoid further increase of) the high paging-channel occupancy of the border paging area.

Figure 2:
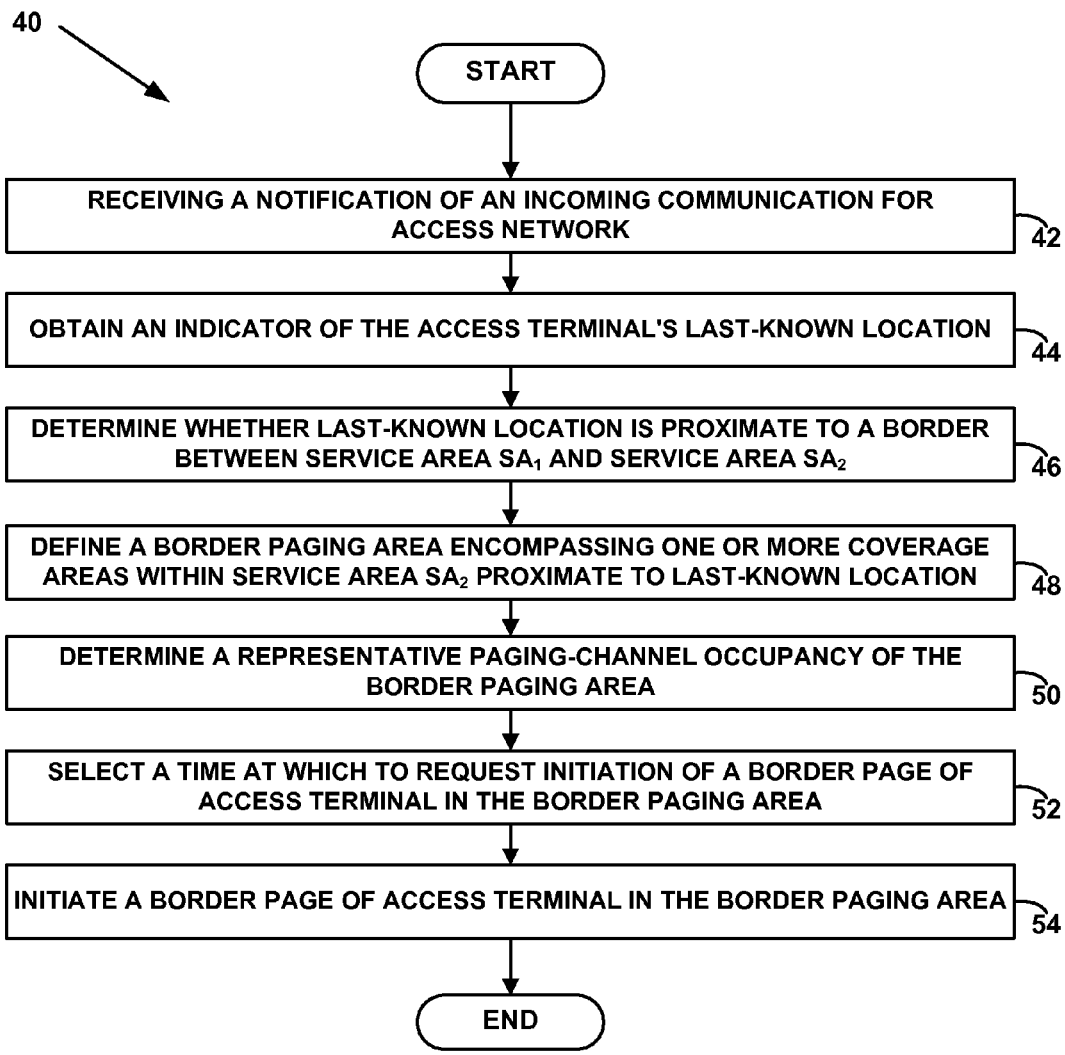
FIG. 2 is a simplified flow chart depicting an exemplary embodiment of a disclosed paging process.

FIG. 2 is a flow chart depicting an exemplary paging process 40. For purposes of illustration, exemplary process 40 will be described with reference to access network 12 paging access terminal 14, which has a last-known location somewhere within service area $SA_1$. It should be understood, however, that exemplary process 40 may be applicable to any configuration in which an access network is paging an access terminal.

As shown in FIG. 2, exemplary process 40 begins at step 42 with sub-network 20 receiving a notification of an incoming communication for access network 14. For instance, MSC 26 of sub-network 20 may receive such a notification from circuit-switched network 16 and/or another MSC (not shown) in access network 12. Alternatively, PDSN 28 of sub-network 20 may receive such a notification from packet-switched network 18. Other examples are possible as well. The incoming communication may be any type of communication, including a phone call, a packet-data transmission, and/or a short message service (SMS) message, as examples.

At step 44, in response to receiving the notification of the incoming communication for access network 14, sub-network 20 may obtain an indicator of the access terminal's last-known location. For example, sub-network 20 may obtain the indicator of the access terminal's last-known location from an HLR and/or VLR that maintains information about access terminal 14. Other examples are possible as well. The obtained indicator of the access terminal's last-known location will preferably include at least an indicator of a last-known coverage area in which access terminal 14 was located, and perhaps one or more other indicators of the access terminal's last-known location (e.g., last-known latitude/longitude of access terminal 14).

At step 46, after obtaining the indicator of the access terminal's last-known location, sub-network 20 may determine whether the access terminal's last-known location is proximate to a border between service area $SA_1$ and an adjacent service area (e.g., service area $SA_2$). Sub-network 20 may perform this determination using any technique now known or later developed, including any technique employed in a current border paging mechanism.

In one example, sub-network 20 may perform this determination based on the obtained indicator of the access terminal's last-known location and a table associating (i) indicators of "border locations" (e.g., coverage areas) within service area $SA_1$ with (ii) indicators of adjacent service areas. Table 1 below shows an exemplary portion of one such table.

TABLE 1

| Service Area $SA_1$ Border Coverage Area | Adjacent Service Area |
|---|---|
| Cell $C_1$ | Service Area $SA_2$ |
| Cell $C_2$ | Service Area $SA_2$ |

This table and the information therein may take various other forms as well. To determine whether the access terminal's last-known location is proximate to a border between service area $SA_1$ and an adjacent service area based on this table, sub-network 20 may search the table for the obtained indicator of the access terminal's last-known location. As a result of this search, sub-network 20 may locate the obtained indicator in the table and thereby determine that the access terminal's last-known location is proximate to a border between service area $SA_1$ and an adjacent service area (e.g., service area $SA_2$). Alternatively, sub-network 20 may fail to locate the obtained indicator in the table and thereby determine that the access terminal's last-known location is not proximate to a border between service area $SA_1$ and any adjacent service area.

At step 48, in response to determining that the access terminal's last-known location is proximate to a border between service area $SA_1$ and service area $SA_2$, sub-network 20 may define a border paging area encompassing one or more coverage areas within service area $SA_2$ that are proximate to the access terminal's last-known location within service area $SA_1$. Sub-network 20 may define this border paging area using any technique now known or later developed, including any technique employed in a current border paging mechanism.

In one example, sub-network 20 may define the border paging area based on the obtained indicator of the access terminal's last-known location and a table associating (i) indicators of border locations (e.g., coverage areas) within service area $SA_1$ with (ii) indicators of proximate border locations (e.g., coverage areas) within service area $SA_2$. Table 2 below shows an exemplary portion of one such table.

TABLE 2

| Service Area $SA_1$ Border Coverage Area | Service Area $SA_2$ Border Coverage Area |
| --- | --- |
| Cell $C_1$ | Cells $C_5$-$C_6$ |
| Cell $C_2$ | Cell $C_6$ |

This table and the information therein may take various other forms as well. Indeed, in one possible example, Tables 1-2 may be combined into a single table that contains information regarding the border locations in service area $SA_1$. To define the border paging area based on this table, sub-network 20 may first look up the obtained indicator of the access terminal's last-known location in the table. In turn, sub-network 20 may identify the associated proximate border locations in service area $SA_2$ for the access terminal's last-known location. Sub-network 20 may then generate data defining the border paging area that includes at least identifiers of the proximate border locations in service area $SA_2$. Other examples are possible as well.

At step 50, after defining the border paging area, sub-network 20 may determine a representative paging-channel occupancy of the border paging area. This representative paging-channel occupancy of the border paging area may take various forms. In one example, the representative paging-channel occupancy of the border paging area may be an average of the paging-channel occupancies of all coverage areas encompassed by the border paging area. As another example, the representative paging-channel occupancy of the border paging area may be a maximum of the paging-channel occupancies of all coverage areas encompassed by the border paging area. As yet another example, the representative paging-channel occupancy of the border paging area may be a ratio between a first summation of a current amount of paging-channel data in all coverage areas encompassed by the border paging area and a second summation of the total capacity of the paging-channels in all coverage areas encompassed by the border paging area. Other examples are possible as well.

Sub-network 20 may determine the representative paging-channel occupancy of the border paging area in various manners. In one example, sub-network 20 may determine the representative paging-channel occupancy of the border paging area based on data indicating the respective paging-channel occupancy of each coverage area encompassed by the border paging area, which may be maintained at one or more entities of access network 12. For instance, being that sub-network 30 serves each coverage area encompassed by the border paging area, one or more entities of sub-network 30 (e.g., MSC 36) may maintain data indicating the respective paging-channel occupancy of each coverage area encompassed by the border paging area. Within this configuration, sub-network 20 may obtain the data indicating the respective paging-channel occupancy of each coverage area encompassed by the border paging area from sub-network 30, such as by sending sub-network 30 a request message and then receiving a response message that includes the requested data. Other examples are possible as well.

At step 52, based on the representative paging-channel occupancy of the border paging area, sub-network 20 may select a time at which to request that sub-network 30 initiate a border page of access terminal 14 in the border paging area. This selected time may be defined in various manners. In a preferred example, the selected time will be defined in terms of a time at which to initiate a given one of the sequence of local pages of access terminal 14 within service area $SA_1$ (e.g., a first, second, or third one of the sequence of local pages). In another example, the selected time may be defined in terms of a time lapse after receiving the notification of the incoming communication for access network 14 (e.g., 5 seconds). Other examples are possible as well.

Sub-network 20 may select the time at which to request that sub-network 30 initiate a border page of access terminal 14 in the border paging area various manners. In one example, sub-network 20 may select the time at which to request that sub-network 30 initiate the border page of access terminal 14 in the border paging area based on a comparison between the representative paging-channel occupancy and a threshold paging-channel occupancy (e.g., 70%). For instance, based on this comparison, sub-network 20 may determine that the representative paging-channel occupancy is lower than the threshold paging-channel occupancy and then responsively select an earlier time at which to request that sub-network 30 initiate the border page of access terminal 14 in the border paging area (e.g., contemporaneously with a time at which sub-network 20 initiates a first one of the sequence of local pages of access terminal 14 within service area $SA_1$). Alternatively, based on this comparison, sub-network 20 may determine that the representative paging-channel occupancy is higher than the threshold paging-channel occupancy and then responsively select a later time at which to request that sub-network 30 initiate the border page of access terminal 14 in the border paging area (e.g., contemporaneously with a time at which sub-network 20 initiates a subsequent one of the sequence of local pages of access terminal 14 within service area $SA_1$). Other examples are possible as well.

In another example, sub-network 20 may select the time at which to request that sub-network 30 initiate the border page of access terminal 14 in the border paging area based on the representative paging-channel occupancy and a table associating (i) indicators of paging-channel occupancy ranges with (ii) indicators of times at which to request initiation of a border page. Table 3 shows an exemplary portion of one such table.

TABLE 3

| Paging-Channel Occupancy | Request Time |
| --- | --- |
| 0%-33% | Contemporaneously with initiation of first one of sequence of local pages |
| 34%-66% | Contemporaneously with initiation of second one of sequence of local pages |
| 67%-99% | Contemporaneously with initiation of third one of sequence of local pages |

This table and the information therein may take various other forms as well. To select the time at which to request that sub-network 30 initiate the border page of access terminal 14 in the border paging area based on this table, sub-network 20 may first look up the respective paging-channel occupancy of the border paging area in the table. In turn, sub-network 20 may identify the associated time at which to request that sub-network 30 initiate the border page of access terminal 14 in the border paging area. Sub-network 20 may then use the identified time as the selected time. Other examples are possible as well.

At step 54, after selecting the time at which to request that sub-network 30 initiate a border page of access terminal 14 in the border paging area, sub-network 20 may request that sub-network 30 initiate a border page of access terminal 14 in the border paging area at the selected time. For example, at the selected time, MSC 26 of sub-network 20 may send to MSC 36 of sub-network 30 an "intersystem page" message that requests a border page of access terminal 14 in the border paging area within service area $SA_2$ (e.g., an ANSI-41 ISPAGE2 message). If sub-network 20 locates access terminal 14 with a local page before the selected time, however, sub-network 20 will forego its request that sub-network 30 initiate a border page of access terminal 14 in the border paging area.

IV. Exemplary Access Network Entity

Figure 3:
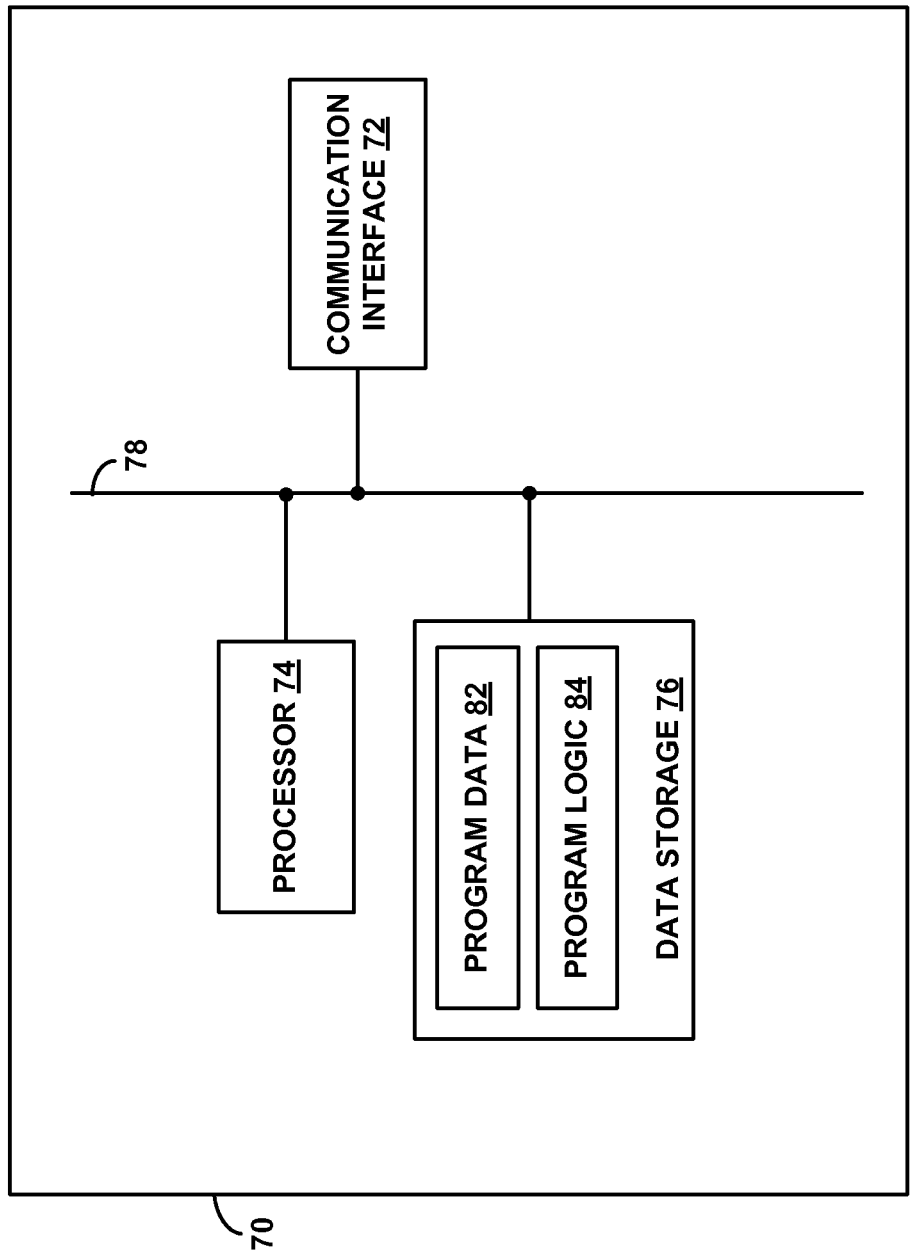
FIG. 3 is a simplified block diagram showing functional components of an exemplary access network entity capable of carrying out features of the exemplary embodiment of the disclosed paging process.

FIG. 3 is a simplified block diagram showing functional components of an exemplary access network entity 70 that is configured to carry out features of exemplary process 40 of the disclosed paging process. Access network entity 70 may take the form of a BSC, an MSC, and/or some other access network entity that is capable of carrying out features of exemplary process 40. As shown in FIG. 4, exemplary access network entity 70 may include a communication interface 72, a processor 74, and data storage 76, all linked together via a system bus, network, or other connection mechanism 78. Access network entity 70 may include other components as well.

Referring to FIG. 4, communication interface 72 may be configured to communicatively couple access network entity 70 to various other entities. For example, if access network entity 70 takes the form of a BSC, communication interface 72 may be configured to communicatively couple the BSC to one or more BTSs, one or more MSCs, and/or one or more PDSNs, among other entities. As another example, if access network entity 70 takes the form of an MSC, communication interface 72 may be configured to communicatively couple the MSC to one or more BSCs, one or more other MSCs, and/or one or more circuit-switched networks, among other entities. Other examples are possible as well. To facilitate these couplings, communication interface 72 may take various forms. For example, communication interface 72 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an entity. Communication interface 72 may also include some combination of different interfaces types. Other configurations are possible as well.

Processor 74 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 76, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 74. Further, some data storage mediums may be external to and/or removable from access network entity 70 and may interface with access network entity 70 in various manners. As shown, data storage 76 may contain (i) program data 82 and (ii) program logic 84, which may be maintained either separately or together within data storage 76.

Program data 82 may contain information relating to the coverage areas within the service area of access network entity 70. For example, program data 82 may contain an identifier of each such coverage area (e.g., a carrier frequency and a PN offset). As another example, program data 82 may contain data defining each such coverage area (e.g., indications of the shape, size, and/or location of each coverage area). As yet another example, program data 82 may contain an indicator of whether each such coverage area is proximate to a border between its encompassing service area and an adjacent service area, and if so, indicators of the adjacent service area and/or proximate coverage areas with the adjacent service area (e.g., Tables 1-2 shown above). Other examples are possible as well.

Further, program data 82 may contain information relating to one or more idle access terminals having a last-known location in the service area of access network entity 70. For example, program data 82 may contain an identifier of each such access terminal. As another example, program data 82 may contain an indicator of a last-known location of each such access terminal, such as an indicator of a last-known coverage area in which the access terminal was located. Other examples are possible as well.

Further yet, program data 82 may contain information relating to a paging process for certain idle access terminals having a last-known location in the service area of access network entity 70. For example, program data 82 may contain data relating to a local paging mechanism for certain idle access terminals, such as data defining a sequence of local pages (e.g., timing and/or ordering) and corresponding local paging areas for certain idle access terminals. As another example, program data 82 may contain data relating to a border paging mechanism for certain idle access terminals, such as data defining a border page (e.g., timing) and a corresponding border paging area for certain idle access terminals. As yet another example, program data 82 may contain data relating to a process for selecting a time at which to request a border page of certain idle access terminals, such as indicators of available times (e.g., times defined in terms of the initiation times for a sequence of local pages), an indicator of a representative paging occupancy of a border paging area for certain idle access terminals, an indicator of a threshold paging occupancy of a border paging area, and/or a table associating indicators of paging-channel occupancy ranges with indicators of times at which to request initiation of a border page (e.g., Table 3 shown above). Other examples are possible as well.

Program logic 84 preferably comprises machine-language instructions that may be executed or interpreted by processor 74 to carry out functions in accordance with exemplary process 40 of the disclosed paging process. For example, program logic 84 may be executable by processor 74 to (a) receive a notification of an incoming communication for an access network, (b) obtain an indicator of the access terminal's last-known location, (c) determine whether the access terminal's last-known location is proximate to a border between the access network entity's service area and an adjacent service area, (d) define a border paging area encompassing one or more coverage areas within the adjacent service area that are proximate to the access terminal's last-known location, (e) determine a representative paging-channel occupancy of the border paging area, and (f) based on the representative paging-channel occupancy, select a time at which to request initiation of a border page of the access terminal in the border paging area. Further, program logic 84 may be executable by processor 74 to request the initiation of the border page of the access terminal in the border paging area. Program logic 84 may be executable by processor 74 to carry out various other functions as well.

V. Conclusion

Exemplary embodiments have been described above. Those skilled in the art will understand, however, that changes and modifications may be made to the embodiments described without departing from the true scope and spirit of the present invention, which is defined by the claims.

We claim:

1. A method of paging an idle access terminal, the method comprising:
   receiving an incoming communication for an idle access terminal having a last-known location in a first service area of an access network;
   in response to receiving the incoming communication, determining that the last-known location is proximate to a border between the first service area and a second service area of the access network and then defining a border paging area encompassing one or more coverage areas within the second service area that are proximate to the last-known location;
   determining a representative paging-channel occupancy of the border paging area;
   based on the representative paging-channel occupancy, selecting a time during a paging process for the idle access terminal at which to initiate a border page of the idle access terminal in the border paging area, wherein the selected time comprises a time that is contemporaneous with a time at which to initiate a given one of a sequence of pages of the idle access terminal in the first service area; and
   beginning the paging process for the idle access terminal.

2. The method of claim 1, wherein the representative paging-channel occupancy of the border paging area comprises an average of paging-channel occupancies of the one or more coverage areas encompassed by the border paging area.

3. The method of claim 1, wherein the representative paging-channel occupancy of the border paging area comprises a maximum of paging-channel occupancies of the one or more coverage areas encompassed by the border paging area.

4. The method of claim 1, wherein the representative paging-channel occupancy of the border paging area comprises a ratio between a first summation of a current amount of paging-channel data in the one or more coverage areas encompassed by the border paging area and a second summation of total capacity of paging-channels in the one or more coverage areas encompassed by the border paging area.

5. The method of claim 1, wherein determining the representative paging-channel occupancy of the border paging area comprises determining the representative paging-channel occupancy of the border paging area based on data indicating the respective paging-channel occupancy of each of the one or more coverage areas encompassed by the border paging area.

6. The method of claim 1, wherein selecting a time at which to initiate a border page of the idle access terminal in the border paging area based on the representative paging-channel occupancy comprises:
   determining that the representative paging-channel occupancy is higher than a threshold paging-channel occupancy and responsively selecting a time at which to initiate a border page of the idle access terminal in the border paging area that is contemporaneous with a time at which to initiate a first one of a sequence of pages of the idle access terminal in the first service area.

7. The method of claim 1, wherein selecting a time at which to initiate a border page of the idle access terminal in the border paging area based on the representative paging-channel occupancy comprises:
   determining that the representative paging-channel occupancy is lower than a threshold paging-channel occupancy and responsively selecting a time at which to initiate a border page of the idle access terminal in the border paging area that is contemporaneous with a time at which to initiate a second one of a sequence of pages of the idle access terminal in the first service area.

8. The method of claim 1, further comprising:
   during the paging process for the idle access terminal, initiating the border page of the idle access terminal in the border paging area at the selected time.

9. A method of paging an idle access terminal, the method comprising:
   receiving, at a first sub-network that serves a first service area of an access network, a notification of an incoming communication for an idle access terminal having a last-known location in the first service area;
   in response to receiving the notification of the incoming communication, the first sub-network determining that the last-known location is proximate to a border between the first service area and a second service area of the access network and then defining a border paging area encompassing one or more coverage areas within the second service area that are proximate to the last-known location;
   the first sub-network determining a representative paging-channel occupancy of the border paging area;
   based on the representative paging-channel occupancy, the first sub-network selecting a time during a paging process for the idle access terminal at which to request that a second sub-network serving the second service area initiate a border page of the idle access terminal in the border paging area, wherein the selected time comprises a time that is contemporaneous with a time at which to initiate a given one of a sequence of pages of the idle access terminal in the first service area; and
   the first sub-network beginning the paging process for the idle access terminal.

10. The method of claim 9, further comprising:
    in response to receiving the notification of the incoming communication, obtaining an indicator of the last-known location before determining that the last-known location is proximate to the border.

11. The method of claim 9, wherein the representative paging-channel occupancy of the border paging area comprises an average of paging-channel occupancies of the one or more coverage areas encompassed by the border paging area.

12. The method of claim 9, wherein the representative paging-channel occupancy of the border paging area comprises an maximum of paging-channel occupancies of the one or more coverage areas encompassed by the border paging area.

13. The method of claim 9, wherein the representative paging-channel occupancy of the border paging area comprises a ratio between a first summation of a current amount of paging-channel data in the one or more coverage areas encompassed by the border paging area and a second summation of total capacity of paging-channels in the one or more coverage areas encompassed by the border paging area.

14. The method of claim 1, wherein determining the representative paging-channel occupancy of the border paging area comprises:
   the first sub-network sending the second sub-network a request for data indicating the respective paging-channel occupancy of each of the one or more coverage areas encompassed by the border paging area;
   as a result of the request, the first sub-network receiving from the second sub-network data indicating the respective paging-channel occupancy of each of the one or more coverage areas encompassed by the border paging area; and
   the first sub-network determining the representative paging-channel occupancy of the border paging area based on the received data indicating the respective paging-channel occupancy of each of the one or more coverage areas encompassed by the border paging area.

15. The method of claim 9, further comprising:
   during the paging process for the idle access terminal, the first sub-network requesting that the second sub-network initiate the border page of the idle access terminal in the border paging area at the selected time.

16. An access network entity comprising:
   a communication interface configured to facilitate communication with an idle access terminal located in a first service area of an access network;
   a processor;
   data storage; and
   program instructions stored in data storage and executable by the processor to:
      receive a notification of an incoming communication for an idle access terminal having a last-known location in the first service area;
      in response to the receipt of the notification, determine that the last-known location is proximate to a border between the first service area and a second service area of the access network and then define a border paging area encompassing one or more coverage areas within the second service area that are proximate to the last-known location;
      determining a representative paging-channel occupancy of the border paging area;
      based on the representative paging-channel occupancy, select a time during a paging process for the idle access terminal at which to request that a second sub-network serving the second service area initiate a border page of the idle access terminal in the border paging area, wherein the selected time comprises a time that is contemporaneous with a time at which to initiate a given one of a sequence of pages of the idle access terminal in the first service area; and
      beginning the paging process for the idle access terminal.

17. A method of paging an idle access terminal, the method comprising:
   receiving an incoming communication for an idle access terminal having a last-known location in a first service area of an access network;
   in response to receiving the incoming communication, (a) determining, based on an indicator of the last-known location and data associating indicators of locations in the first service area with indicators of one or more service areas of the access network that are adjacent to the first service area, that the last-known location is proximate to a border between the first service area and a second service area that is adjacent to the first service area, and (b) defining, based on the indicator of the last-known location and data associating indicators of locations in the first service area with indicators of locations in the second service area, a border paging area encompassing one or more coverage areas within the second service area that are proximate to the last-known location;
   determining a representative paging-channel occupancy of the border paging area;
   based on the representative paging-channel occupancy, selecting a time during a paging process for the idle access terminal at which to initiate a border page of the idle access terminal in the border paging area; and
   beginning the paging process for the idle access terminal.

* * * * *